Patented Aug. 10, 1948

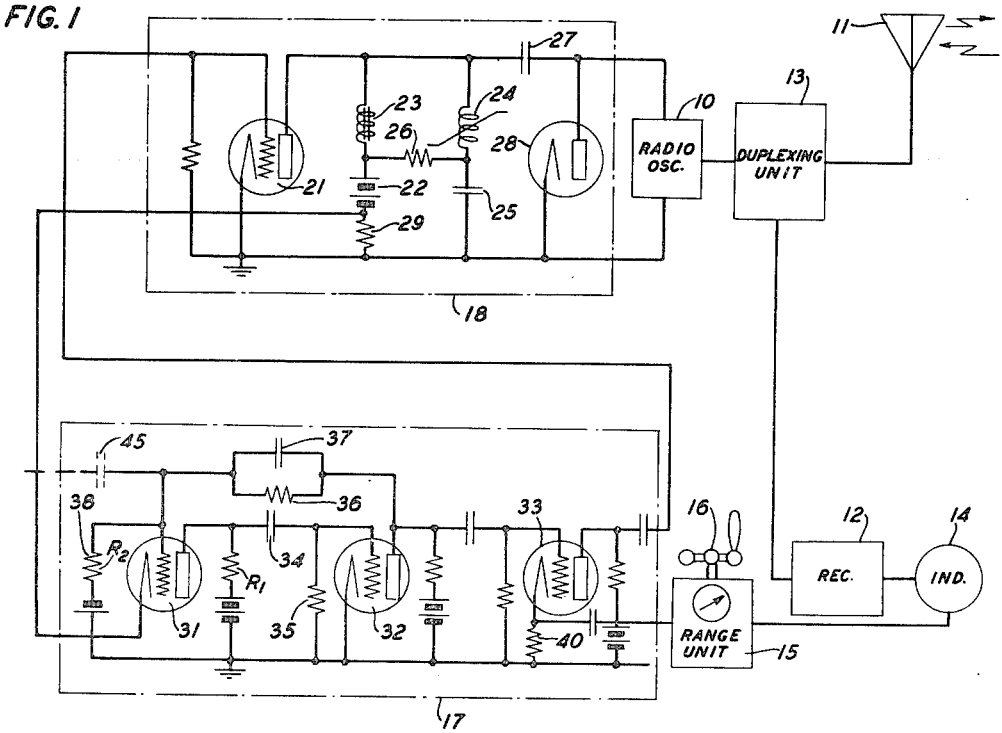
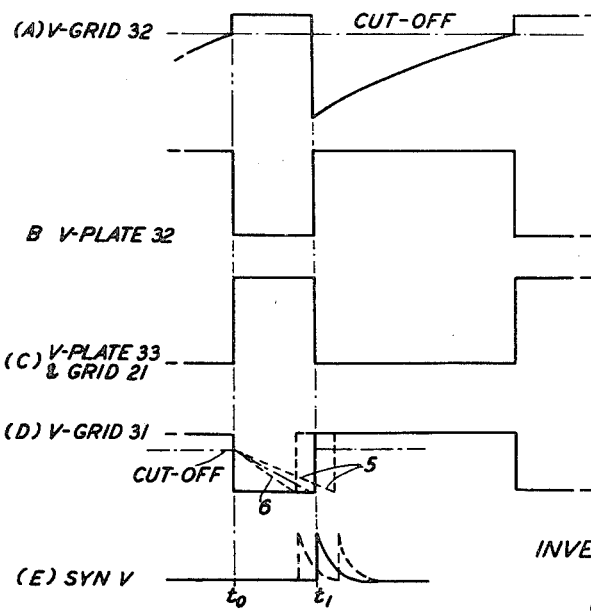

2,446,630

UNITED STATES PATENT OFFICE 2,446,630

RANGE MEASUREMENT

Newton W. Bryant, Chatham, Elmo E. Crump,
East Orange, Merrill R. Dungan, Chatham, and
John Strand, Morris Plains, N. J., assignors to
Bell Telephone Laboratories, Incorporated,
New York, N. Y., a corporation of New York Application May 2, 1944, Serial No. 533,754

6 Claims. (Cl. 343—13)

This invention relates to object locators of the pulse reflection type and particularly to pulse generators therefor.

An object of the invention is to improve the accuracy of distance measurement by such pulse reflection systems.

In one type of system for object location, recurrent pulses of ultra-high frequency waves are transmitted and the reflections from objects under consideration are observed. The distance to the object under observation is determined by measuring the time required for the pulse to travel to the object and return. Since the velocity of propagation of the pulses of ultra-high frequency waves is substantially that of light even small errors in time measurement may represent relatively large errors in distance.

One system that has been found very effective for the measurement of the time interval that determines the distance is by the use of a system for generating timing or range pulses synchronously with the transmitted pulse and delaying the range pulse by a variable, calibrated amount until it corresponds with the received echo pulse. Such a system is disclosed in the copending application of L. A. Meacham, Serial No. 505,024, filed October 5, 1943 which matured into Patent No. 2,422,205, issued June 17, 1947.

In the use of a range indicator of the type of the above Meacham application, the generation of the range pulse may be initiated by the same synchronizing source that times the transmission of the radio pulses. Accordingly accurate range measurement is dependent upon a fixed time relation between the synchronizing source and the emission of the radio pulse. It has been found that with some types of pulse generators the time interval between the synchronizing pulse and the emission of the radio pulse is dependent upon the voltage of the power supply which it is not always expedient to regulate accurately. This is the case with pulse generators of the non-linear coil type such as are shown in the copending applications of W. Shockley, Serial No. 460,328, filed October 1, 1942, which matured into Patent No. 2,416,718 issued March 4, 1947, and Crump and Kersta, Serial No. 512,294, filed November 30, 1943, now Patent No. 2,419,201 issued April 22, 1947, for example.

Another object of the invention is to stabilize the operation of such pulse generators for variation in supply voltage.

A further object of the invention is to provide a fixed time relation between the synchronizing pulse and the transmitted radio pulse.

The operation of the non-linear coil pulse generators of the type referred to depends upon a double storage of energy, first in an inductive system and then in a capacitive system from which it is transferred to the radio frequency oscillation generator. This last transfer is controlled by the saturation of a non-linear inductor and will be dependent upon the energy storage or the equivalent, the voltage developed. Accordingly, the time required for the non-linear inductor to saturate will normally depend upon the supply voltage.

In accordance with a feature of this invention, the amount of energy stored in the system for the generation of each pulse is maintained fixed and independent of the supply voltage. This is accomplished by using a multivibrator for determining the length of time that current is supplied to the inductive system for the first energy storage operation and determining the multivibrator period in part by the value of the current flowing in the inductive system.

These and other objects, features and aspects of the invention may be more fully understood by reference to the following detailed description in connection with the drawing, in which:

Fig. 1 is a schematic circuit diagram of one embodiment of the invention; and

Fig. 2 is a series of graphs showing various operating characteristics of the circuit of Fig. 1.

Fig. 1 shows a pulse reflection ranging system in which recurrent pulses of radio waves generated by an oscillator 10 are transmitted from a suitable antenna 11. The echo or reflected pulses are received in the same antenna and amplified and detected in a suitable radio receiver 12. A duplexing unit 13 connected in the radio frequency leads to the antenna 11, protects the receiver 12 against the high power oscillations supplied by the transmitting oscillator 10.

The output of the receiver 12 is supplied to the indicator 14 for observation. Range pulses produced by the range unit 15 are also supplied to the indicator 14 to permit measurement of the distance to the reflecting object. This range unit 15 may be of the type described in the application of Meacham previously identified in which the generation of the ranging pulse is initiated by a synchronizing pulse from the synchronizing unit 17. The range pulse is delayed with respect to the synchronizing pulse by an amount controllable by the operation of the crank 16 until it coincides with the received echo pulse and the distance to the reflecting object determined by the amount of delay introduced.

The transmitting oscillator 10 is energized for the production of the transmitted pulses by direct current pulses produced by the pulse generator 18 which is of the type disclosed in the application of Crump and Kersta, previously identified. The operation of the pulse generator 18 is controlled by a synchronizing pulse from the synchronizing unit 17.

The pulse generator 18 operates as follows: Beginning at a time when the control tube 21 is rendered conductive by the synchronizing pulse from the synchronizing unit 17, current is supplied from the battery 22 through the space path of the tube 21 to the inductor 23 and builds up approximately linearly owing to the high inductance of coil 23. During this period current will also build up in the non-linear inductor 24 whose inductance is high for low values of current within the unsaturated condition of its core but drops abruptly to a substantially negligible value when the saturated region is reached. When the tube 21 becomes conducting, the current in inductor 24 builds up due to the discharge of the charge on capacitor 25 which had been accumulating during a previous operating cycle. However, this charge is rapidly dissipated as the inductor 24 reaches its saturated condition but the current therethrough is maintained at approximately the saturation value by the current supplied through the bias resistor 26.

After the current through inductor 23 has built up to its desired value, the tube 21 is cut off by voltage supplied from the synchronizing unit 17. The current through inductor 23 will, however, continue to flow and will now flow to the storage capacitor 27 through the charging diode 28. This oscillatory transient will build up a high voltage on the storage capacitor 27. At the same time the current through the non-linear inductor 24 will first decrease, then reverse and finally reach the saturation point in the opposite direction. As soon as this saturation region is reached the inductance of the inductor 24 becomes negligible providing a low impedance path for the discharge of the storage capacitor 27 to the radio oscillator 10. As a result the oscillator 10 produces ultra-high frequency oscillations of the duration of the pulse discharge from the capacitor 27.

For the best operation, the system is so designed that the saturation time of the non-linear inductor 24 is equal to the time required for the storage capacitor 27 to develop its maximum voltage. A more detailed discussion of the operation of the pulse generator of this type will be found in the application of Crump and Kersta.

From a consideration of the operation of the pulse generator 18 as described above, it will be observed that if the time during which the tube 21 is maintained conducting is maintained fixed, any variation in the voltage of the battery 22 will produce variations in the value to which the current in the inductor 23 will build up and consequently variations in the voltage developed on the storage capacitor 27. Accordingly, the time required for the inductor 24 to reach its saturation region will vary. As a result the time interval between the occurrence of the synchronizing pulse produced on the shut-off of the tube 21 and the generation of the radio pulse would vary. Since it is that synchronizing pulse which initiates the operation of the range unit 15 such a variation would introduce an error in the range zero setting and result in errors in range measurement. Such errors are eliminated by the circuit of this invention as will now be described.

The synchronizing unit 17 comprises two tubes 31 and 32 connected as a multivibrator and an amplifier tube 33. In the understanding of the operation of this circuit, Fig. 2 which shows various circuit voltages plotted against time may be found helpful. Assuming that just prior to the time $t_0$ the tube 31 is conducting, the resistors 36 and 38 being chosen to hold its grid at an appropriate voltage and at the same time the tube 32 is non-conducting due to the negative voltage on its grid resulting from the charge on capacitor 34 from a previous cycle of operation; as the charge on capacitor 34 is drained off through resistor 35 the potential on the grid of tube 32 rises until it reaches the cut-off point at the time $t_0$ and tube 32 becomes conducting. The consequent drop in the voltage of the plate of tube 32 carries the grid of tube 31 below cut-off and holds it there due to the direct coupling through resistor 36 (capacitor 37 is a small capacitor to compensate for the grid capacitance of tube 31).

The drop in the plate voltage of tube 32 at the instant $t_0$ causes tube 33 to become cut off producing a rise in its plate voltage that is impressed on the grid of tube 21 causing it to become conductive. Current accordingly begins to flow through the space path of tube 21 and inductor 23. This current will rise substantially linearly at the same time producing a corresponding rising voltage across the resistor 29. This voltage drop across resistor 29 is applied as a bias on the cathode of tube 31 causing the voltage of the cathode to increase negatively with respect to ground and consequently to drive tube 31 toward the conducting region. As soon as tube 31 starts to conduct the drop in its plate voltage drives the grid of tube 32 beyond cut-off and the resulting rise in the plate voltage of tube 32 causes tube 33 to conduct with a consequent drop in its plate voltage which is impressed on the grid of tube 21 causing it to cut off. This interrupts the flow of current from battery 22 to inductor 23 whenever the current has reached such a value as to produce a voltage drop in resistor 29 sufficient to cause 31 to conduct. Accordingly the current through inductor 23 will always build up to the same value.

The operation of the synchronizing unit particularly with respect to the compensating feature can probably be best understood by reference to curves D and E of Fig. 2. As shown in that figure, the voltage from the resistor 29 applied to the cathode of tube 31 may be considered as changing the cut-off voltage of the tube. When this cut-off line (dash-dot line) intersects the grid voltage line, the tube 31 starts to conduct. When the voltage of the battery 22 is below normal the current through the inductor 23 will rise more slowly. Consequently, the voltage across resistor 29 will also rise more slowly and it will take longer for the cut-off line to reach the grid voltage line, as is represented by the dotted line 5 of Fig. 2D. Similarly, when the voltage of battery 22 is above normal the voltage across resistor 29 will rise more rapidly with the consequent result indicated by the dotted line 6 of Fig. 2D. Under any circumstances, the synchronizing pulse produced across the resistor 40 and supplied to the range unit 15 will occur at the instant the tube 31 becomes conducting. This is shown by the curves in Fig. 2E.

If it is desired to maintain a pulse rate of greater stability than that established by the multivibrator 31—32 or to synchronize the system with other systems, a synchronizing pulse may be applied to the grid of tube 31 by means of connections such as the capacitor 45 shown in dotted lines. Under such conditions the time constant of the capacitor 34 and resistor 35 is made somewhat longer than that required to produce recurrent cycles at exactly the rate established by the pulses supplied through the capacitor 45.

Accordingly, the tube 31 will remain conducting until the synchronizing pulse is supplied to its grid at which instant it will be caused to reduce its plate current and render tube 32 conducting. Subsequent steps in the cycle of operation will be the same as described above.

What is claimed is:

1. In a distance measuring system of the pulse reflection type, a pulse generator having an inductive circuit, a source of direct current and a vacuum tube through which current from said source is built up in said inductive circuit, means for generating a timing pulse of length determining the time that current is built up in said inductive circuit, means impressing said pulse on said vacuum tube to cause the flow of current from said source through said inductive circuit for the duration of said pulse and means responsive to the current in said inductive circuit for regulating said means for generating a timing pulse so that said current is always built up to the same value.

2. In a distance measuring system of the pulse reflection type, a pulse generator having an inductive circuit, a source of direct current and switching means for controlling the flow of current from said source in said inductive circuit, a timing pulse generator, connections for supplying said timing pulse to said switching means for controlling its operation to cause the flow of current into said inductive circuit for the duration of the pulse produced by said generator, means responsive to the current in said inductive circuit for regulating said timing pulse generator so that the current in said inductive circuit always builds up to the same value, time measuring means, and means controlled by said timing pulse for initiating the operation of said time measuring means.

3. In a distance measuring system of the pulse reflection type, a pulse generator having an inductive circuit, a source of direct current and switching means for controlling the current flow in said inductive circuit from said source, a multivibrator for generating a timing pulse, connections for supplying the timing pulse generated by said multivibrator to said switching means for controlling its operation to cause the flow of current into said inductive circuit for the duration of said pulse, means for developing a voltage proportional to the current in said inductive circuit and connections for supplying said voltage to said multivibrator to regulate the length of said timing pulse.

4. In a distance measuring system of the pulse reflection type, a pulse generating circuit comprising an inductive circuit, switching means for controlling the flow of current through said inductive circuit, a storage capacitor connected to be charged by the surge developed upon the interruption of the current flow through said inductive circuit, and a saturable core reactor for discharging said storage capacitor, means for generating a timing impulse for controlling said switching means, means responsive to the current through said inductive circuit for controlling said means for generating a timing impulse, and time measuring means initiated by said timing impulse.

5. A combination according to claim 4 in which the means responsive to the current through said inductive circuit, comprises means for developing a voltage proportional to said current and connections for supplying said voltage to said means for generating a timing impulse.

6. In a distance measuring system, an ultrahigh frequency generator, means for radiating oscillations produced by said generator, means for receiving and observing oscillations produced by the reflection of said radiated oscillations by an object under consideration, a generator of pulses for energizing said ultra-high frequency generator comprising an inductive circuit, a vacuum tube for establishing an intermittent flow of current through said inductive circuit, a storage capacitor connected to be charged by the surge developed upon the interruption of said flow of current, and a saturable core inductor connected to discharge said capacitor to said ultrahigh frequency generator, a timing pulse generator, connections for supplying the timing pulse generated thereby to said vacuum tube for controlling its operation, means responsive to the current flow in said inductive circuit for regulating said timing pulse generator, time measuring means for determining the time elapsing between the radiation of said oscillations and the reception of said reflected oscillations, and means responsive to said timing pulse for initiating the operation of said time measuring means.

NEWTON W. BRYANT.
ELMO E. CRUMP.
MERRILL R. DUNGAN.
JOHN STRAND.

REFERENCES CITED

The following references are of record in the file of this patent:

UNITED STATES PATENTS

| Number | Name | Date |
|---|---|---|
| 2,344,745 | Somers | Mar. 21, 1944 |

FOREIGN PATENTS

| Number | Country | Date |
|---|---|---|
| 452,583 | Great Britain | Aug. 25, 1936 |

OTHER REFERENCES

Reich, Theory and Application of Electron Tubes, McGraw-Hill, 1939, page 345.